United States Patent
Zhang et al.

(10) Patent No.: US 8,110,167 B2
(45) Date of Patent: Feb. 7, 2012

(54) NANOWIRE SYNTHESIS FROM VAPOR AND SOLID SOURCES

(75) Inventors: Jiguang Zhang, Richland, WA (US); Jun Liu, Richland, WA (US); Zhenguo Yang, Richland, WA (US); Guanguang Xia, Pasco, WA (US); Leonard S Fifield, Richland, WA (US); Donghai Wang, Richland, WA (US); Daiwon Choi, Kennewick, WA (US); Gordon Graff, West Richland, WA (US); Larry R Pederson, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 478 days.

(21) Appl. No.: 12/368,711

(22) Filed: Feb. 10, 2009

(65) Prior Publication Data

US 2010/0202952 A1 Aug. 12, 2010

(51) Int. Cl.
*C01B 33/02* (2006.01)

(52) U.S. Cl. ........ 423/350; 977/722; 977/775; 977/843; 977/762; 977/721; 423/345; 423/344; 423/408; 423/349; 423/618; 423/325; 420/556; 420/557

(58) Field of Classification Search .................. None
See application file for complete search history.

(56) References Cited

U.S. PATENT DOCUMENTS

| | | | |
|---|---|---|---|
| 7,297,446 | B2 | 11/2007 | Fukui et al. |
| 7,335,259 | B2 | 2/2008 | Hanrath et al. |
| 2006/0046480 | A1* | 3/2006 | Guo ................................ 438/685 |
| 2007/0105356 | A1* | 5/2007 | Wu et al. ......................... 438/584 |
| 2008/0261112 | A1* | 10/2008 | Nagata et al. ................ 429/218.1 |
| 2009/0042102 | A1 | 2/2009 | Yi et al. |
| 2009/0176159 | A1 | 7/2009 | Aruna et al. |

FOREIGN PATENT DOCUMENTS

WO 2005119753 A2 12/2005

OTHER PUBLICATIONS

Chang, J.B., et al.; "Ultrafast growth of single-crystalline Si nanowired", Materials Letters, 2006, 2125-2128 pps., vol. 60, Elsevier.

Lee, Kun-Hong, Ph.D., "Synthesis of Si nanowires for an anode material of Li batteries", Defense Technical Information Center Report; Jun. 28, 2006-Nov. 1, 2007, 30 pages, South Korea.

(Continued)

*Primary Examiner* — Melvin Mayes
*Assistant Examiner* — Smita Patel
(74) *Attorney, Agent, or Firm* — Allan C. Tuan

(57) ABSTRACT

Methods of the present invention can be used to synthesize nanowires with controllable compositions and/or with multiple elements. The methods can include coating solid powder granules, which comprise a first element, with a catalyst. The catalyst and the first element should form when heated a liquid, mixed phase having a eutectic or peritectic point. The granules, which have been coated with the catalyst, can then be heated to a temperature greater than or equal to the eutectic or peritectic point. During heating, a vapor source comprising the second element is introduced. The vapor source chemically interacts with the liquid, mixed phase to consume the first element and to induce condensation of a product that comprises the first and second elements in the form of a nanowire.

11 Claims, 4 Drawing Sheets

OTHER PUBLICATIONS

Sunkara, M.K., et al., "Bulk synthesis of silcon nanowires using a low-temperature vapor-liquid-solid method", Applied Physics Letters, Sep. 3, 2001, 1546-1548 pps., vol. 79, No. 10, Louisville, KY, USA.

Chan, Candace K., et al., "High-performance lithium battery anodes using silicon nanowires", Nature Nanotechnology, Jan. 2008, 31-35 pps., vol. 3, Stanford, CA, USA.

Xing, Y.J., et al., "Silicon nanowires grown from Au-coated Si substrate", Applied Physics A, 2002, 551-553 pps., vol. 76, Springer-Verlag, China.

Yu, D.P., et al., "Controlled growth of oriented amorphous silicon nanowires via a solid-liquid-solid (SLS) mechanism", Physica E, 2001, 305-309 pps., Elsevier, China.

Yan, H.F., et al., "Growth of amorphous silicon nanowires via a solid-liquid-mechanism", Chemical Physics Letters, Jun. 16, 2000, 224-228 pps., vol. 323, Elsevier, China.

PCT International Search Report and Written Opinion.

Kim, Hyunjung, "Three-Dimensional Porous Silicon Particles for Use in High-Performance Lithium Secondary Batteries," Angew. Chem. Int. Ed, 2008, vol. 47, pp. 1-5, Wiley-VCH Verlag InterScience, Hanyang University, Ansan, Korea.

* cited by examiner

NANOWIRE SYNTHESIS FROM VAPOR AND SOLID SOURCES

BACKGROUND

In the field of nanomaterials, nanowires comprising semiconductors are commercially desirable and can be implemented across a broad variety of applications including electronics and optoelectronics. However, while growth of semiconductor nanowires in small quantities and/or as thin films is common, both large-scale synthesis and bulk growth continue to present significant challenges.

Conventional processes for synthesizing nanowires include the vapor-liquid-solid (VLS) approach and the solid-liquid-solid (SLS) approach. Traditionally, SLS and VLS have been applied on relatively large, monolithic substrates to yield two dimensional growth (see 100 in FIG. 1a). FIG. 1b contains illustrations depicting VLS and SLS applied to monolithic substrates. In VLS growth 101, the semiconductor material is supplied as a gas and is adsorbed by liquid nanodroplets of an appropriate catalytic material formed on a substrate. The nanodroplets serve as seeds for nanowire growth. The semiconductor material condenses at the interface between the droplet and the nanowire. The SLS process 102 is similar to VLS growth except that in SLS growth, the semiconductor material is supplied as a solid. The catalyst and the semiconductor material form a liquid mixture from which the semiconductor material condenses to form the semiconductor nanowire.

Traditionally, SLS and VLS have been applied on relatively large, monolithic substrates to yield two dimensional growth. When applying SLS or VLS to a monolithic substrate, nanowire synthesis is limited to growth directions away from the substrate. Furthermore, the nanowires being attached to the substrate conform to the surface 100 and do not fill the available volume. In one modification to the traditional approach, referring to FIG. 1a, the semiconductor material can comprise a powder, rather than a monolithic substrate, and the powder granules are coated with the catalyst. The use of the semiconductor powder can lead to three dimensional growth 104 that is easily scalable.

One common problem associated with SLS growth using semiconductor powders is that the composition of the nanowires resulting from SLS growth is inconsistent and hard to control. Furthermore, existing SLS and VLS approaches, whether implemented with powders or monolithic substrates, do not typically facilitate the synthesis of nanowires comprising multiple elements. Accordingly, a need exists for improved methods of synthesizing semiconductor nanowires.

SUMMARY

The present invention includes methods of fabricating nanowires comprising first and second elements. The methods can be characterized by coating solid powder granules, which comprise a first element, with a catalyst. The catalyst and the first element should form liquid when heated, mixed phase having a eutectic or peritectic point. The granules, which have been coated with the catalyst, can then be heated to a temperature greater than or equal to the eutectic or peritectic point. During heating, a vapor source comprising the second element is introduced. The vapor source chemically interacts with the liquid, mixed phase to consume the first element and to induce condensation of a product that comprises the first and second elements in the form of a nanowire. Accordingly, the methods of the present invention require the presence of both a vapor source and a solid source, and can be used to synthesize nanowires comprising multiple elements.

In preferred embodiments the product has a higher melting point than that of the first element. In a particular example, the first element comprises silicon. The second element can then comprise oxygen, nitrogen, carbon, or silicon. The resultant nanowires would then comprise silicon oxide, silicon nitride, silicon carbide, or substantially pure silicon respectively.

In one embodiment, silicon-containing nanowires synthesized according to embodiments of the present invention can be formed into an electrode in an energy storage device having a discharge capacity greater than or equal to 400 mAh/g. In another embodiment, the discharge capacity is greater than or equal to 1300 mAh/g. An exemplary energy storage device includes, but is not limited to a Li-ion battery.

Synthesis of nanowires comprising predominantly silicon can be accomplished according to embodiments of the present invention when both the solid source and the vapor source comprise silicon. A specific example involves using $SiCl_4$ as the vapor source. When the first element comprises silicon, a suitable catalyst, among others, can comprise nickel. In such an instance the nickel-coated silicon powder can be heated to a temperature between 900° C. and 1050° C.

While the methods of the present invention are well-suited for synthesizing nanowires comprising silicon, they are not limited to such. For example, the first element can comprise other semiconducting elements or elements that form semiconducting materials when combined with the second element. For example, the first element can comprise Ge or Sn. The second element can then comprise oxygen, nitrogen, carbon, or combinations thereof. Suitable catalysts can include, but are not limited to, Ni, Fe, Al, Au, and Cu or combinations thereof.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

According to embodiments of the present invention, one or more elements from a vapor source are used to induce nanowire growth from a solid source. Accordingly, the vapor-induced solid-liquid-solid (VI-SLS) approach requires the presence of both vapor and solid sources.

Figure 1A:
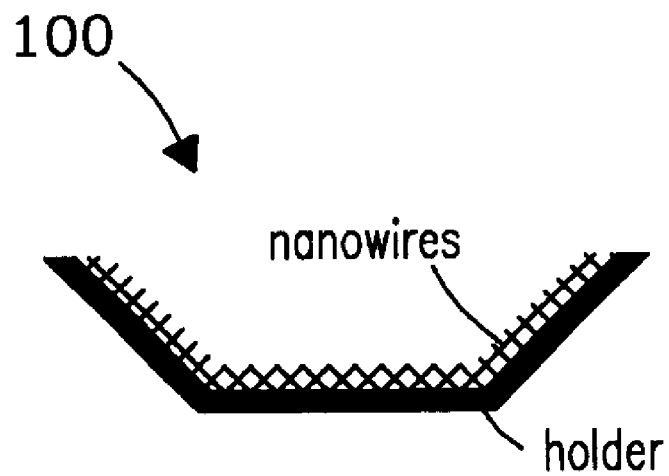
FIG. 1a and 1b are illustrations depicting 2-D and 3-D growth using SLS and/or VLS processes.
Figure 1A:
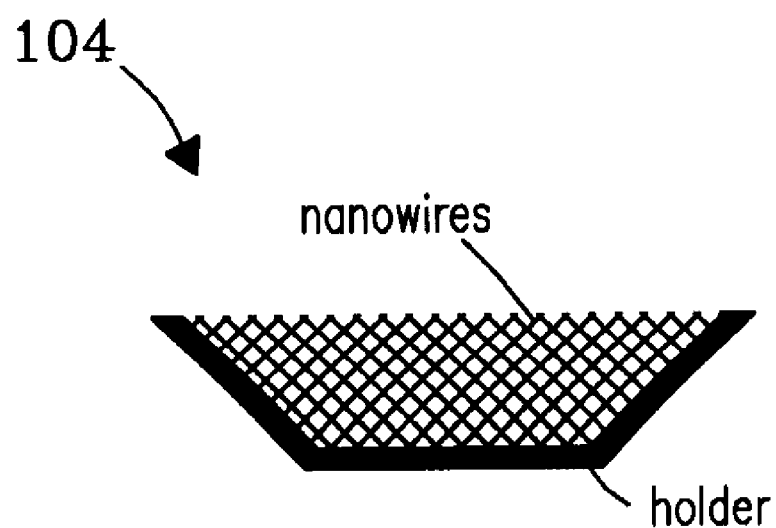
Figure 1B:
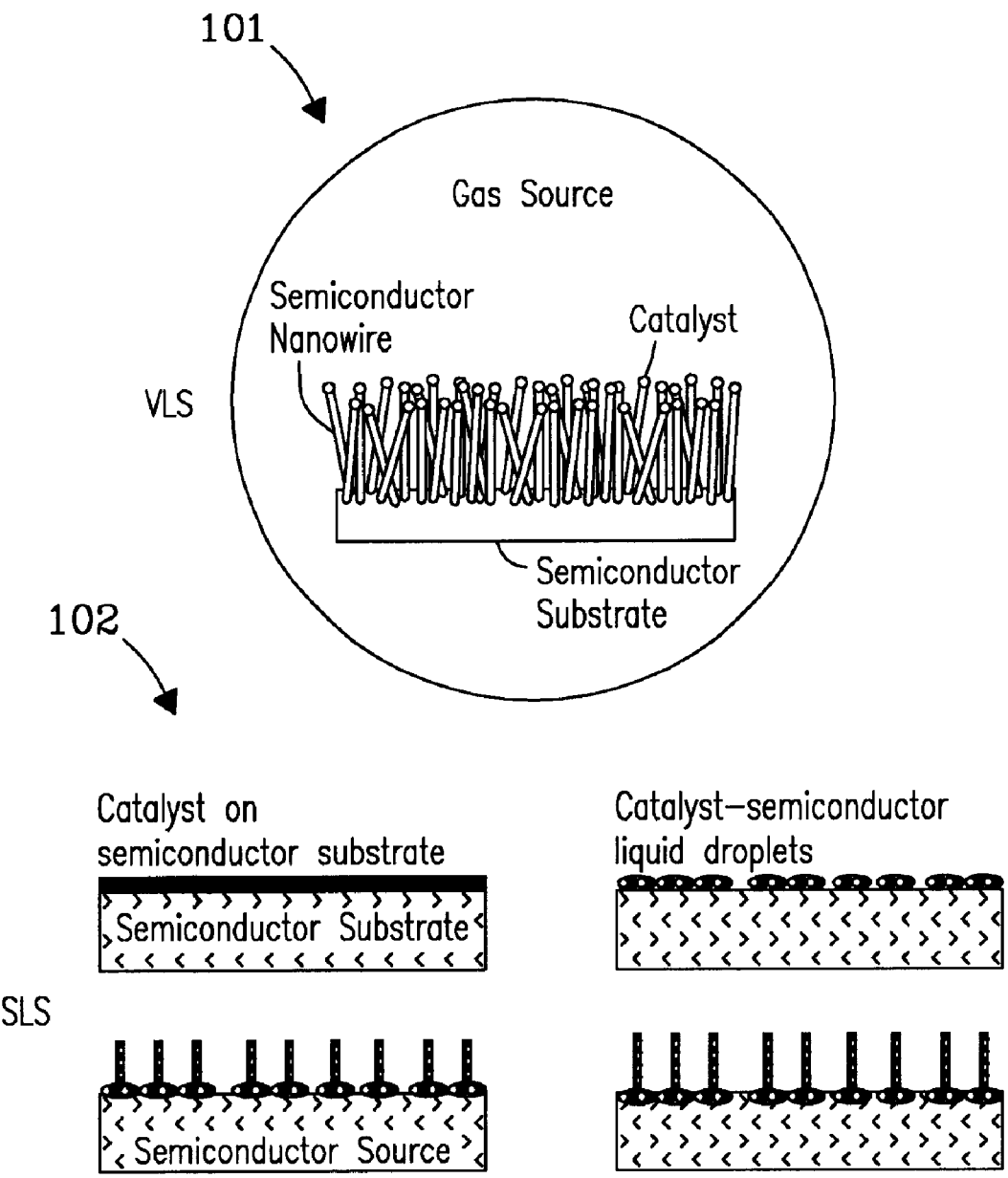
Figure 2:
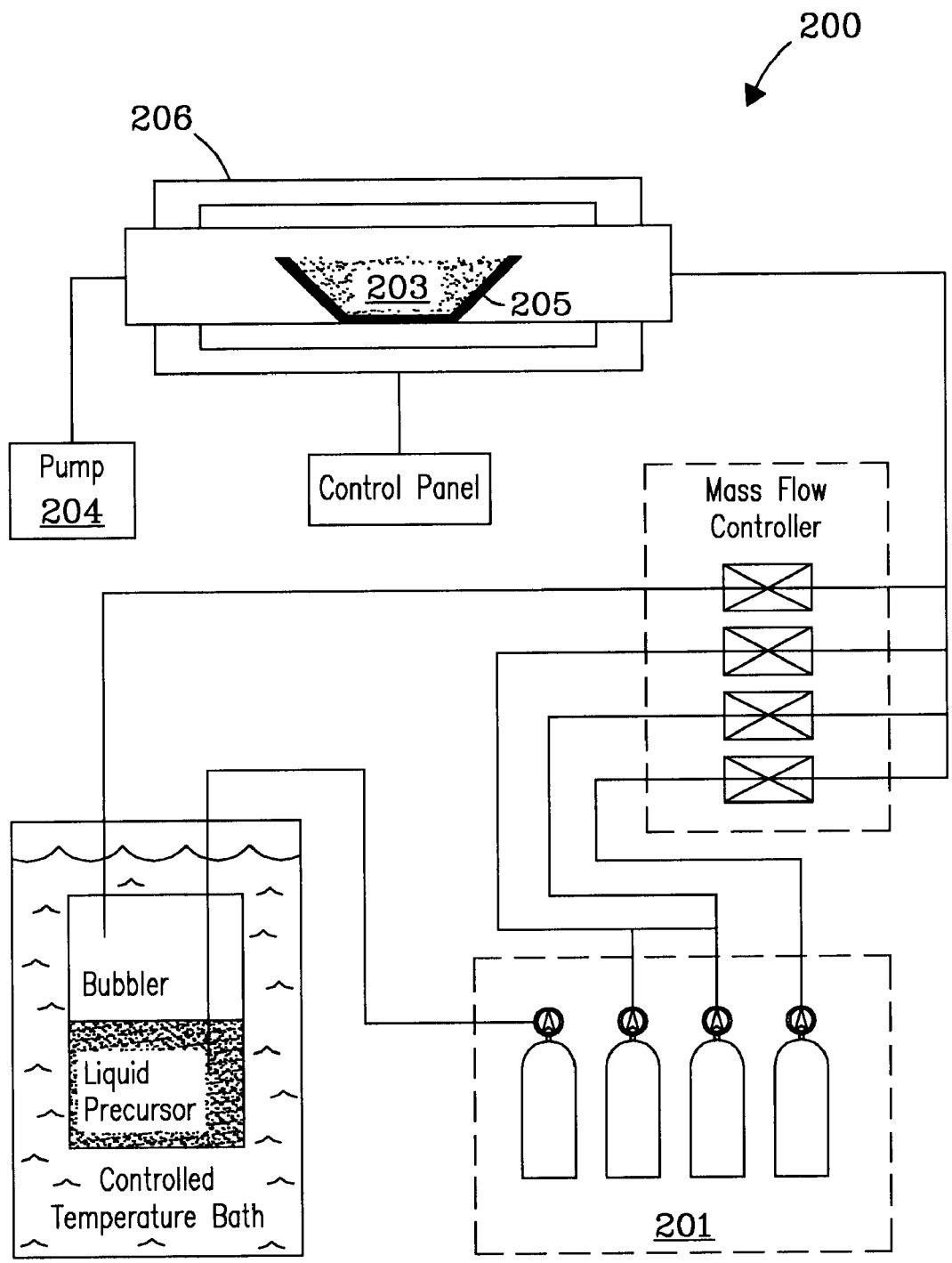
FIG. 2 is a diagram of an exemplary apparatus for synthesizing nanowires according to embodiments of the present invention.
Figure 3:
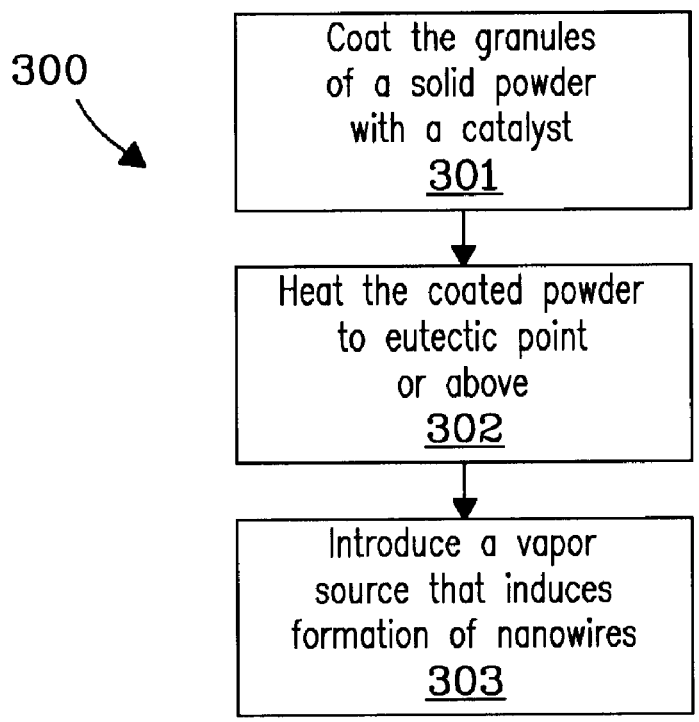
FIG. 3 is a block diagram depicting methods of synthesizing nanowires according to embodiments of the present invention.

FIGS. 2 and 3 show various aspects and/or embodiments of the present invention. Referring first to FIG. 2, the illustration depicts an exemplary apparatus 200 for nanowire growth. One or more gases 201, which comprise an element that induces nanowire growth or that serves as a cover gas, can be introduced into the furnace 206 through the vapor lines 202. The solid powder 203 coated with a catalyst can be contained in the furnace in the ceramic holder 205, while a pump 204 evacuates gases from the furnace.

Referring to FIG. 3, a block diagram 300 depicts the methods of the present invention. The methods comprise coating 301 solid powder granules, which comprise a first element, with a catalyst. The catalyst and the first element should form when heated a liquid, mixed phase having a eutectic or peritectic point. The granules, which have been coated with the catalyst, can then be heated 302 to a temperature greater than or equal to the eutectic or peritectic point. During heating, a vapor source comprising the second element is introduced 303. The vapor source chemically interacts with the liquid, mixed phase to consume the first element and to induce condensation of a product that comprises the first and second elements in the form of a nanowire. Accordingly, the methods of the present invention require the presence of both a vapor source and a solid source, and can be used to synthesize nanowires comprising multiple elements.

In one example that demonstrates aspects of the present invention, Si nanowires can be prepared from Si powder and a carbon-containing gas. In order to minimize unintentional sources of carbon, the growth should occur in a carbon-free furnace, such as a quartz tube furnace. The silicon powder is the solid source and is coated with a nickel catalyst. An exemplary carbon-containing gas includes $CH_4$. The nickel-coated Si powder is prepared by grinding as-received, fine Si powder and then coating with Ni using a 10% solution of $Ni(NO_3)_2 \cdot 6H_2O$ in water. The Ni-coated Si powder can then be dried and placed in a ceramic boat in the center of the furnace. The furnace is pumped to reduced pressure (e.g., $10^{-3}$ Torr) and refilled with an $Ar/H_2$ gas mixture (2.75% $H_2$). This process is repeated three times to minimize the residual air and contamination in the tube furnace. During growth, the furnace can be filled with an $Ar/H_2$ gas mixture (2.75% $H_2$) and approximately 1% $CH_4$ gas. The furnace pressure is controlled at approximately 15 Torr by adjusting the gas flow rate and the pumping speed. The furnace is heated a rate of 5° C./min to 500° C. and held at this temperature for 1 h. The temperature in the furnace is then increased at a rate of 10° C./min to 950° C. and held at this temperature for 2 to 6 hours. After SiC nanowire growth, the furnace is allowed to cool to room temperature in a rate of 10° C./min. The reaction process can be expressed as follows.

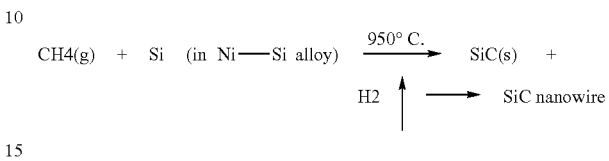

Similarly, the aspects of the present invention can be applied to synthesize silicon nitride nanowires. In such instances, the vapor source would comprise a nitrogen-containing gas such as $NH_3$. The appropriate reaction process can be expressed as follows.

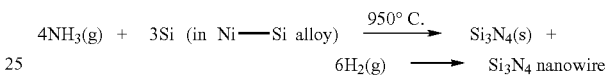

In yet another example, substantially pure silicon nanowires can be prepared by introducing a vapor source comprising Si. The Si from the vapor source can react with the Si in the liquid, mixed phase to produce silicon nanowires. An exemplary vapor source can include, but is not limited to, $SiCl_4$. Since $SiCl_4$ is a liquid at room temperature, it can be introduced into the furnace by a bubbler system using an inert carrier gas and/or by a liquid delivery system and vaporizer apparatus. The reaction process can be expressed as follows.

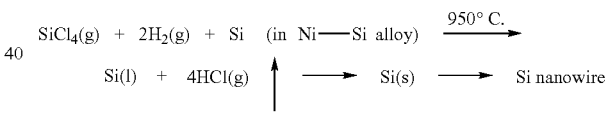

In still another example, $SiO_x$ nanowires with substantially no SiC core can be prepared in a quartz tube furnace with minimal carbon contaminants. In this case, as received fine Si powder is ground for use as a solid silicon source. The ground sample was then coated with 10% Ni using $Ni(NO_3)_2 \cdot 6H_2O$ in water solution. The dried powder was placed in a ceramic boat and placed in the center of the furnace. The furnace was pumped down to $10^{-3}$ Torr and refilled with $Ar/H_2$ mixture (2.75% H2). Oxygen gas was used as the second element. The furnace was heated at a rate of 5° C./min to 500° C. and held at this temperature for 1 h, then heated at a rate of 10° C./min to 950° C. and held at this temperature for 2 to 6 hours. After nanowire growth, the sample was cooled to room temperature in a rate of 10° C./min. This reaction process can be expressed as follows.

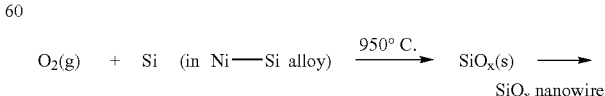

Figure 4:
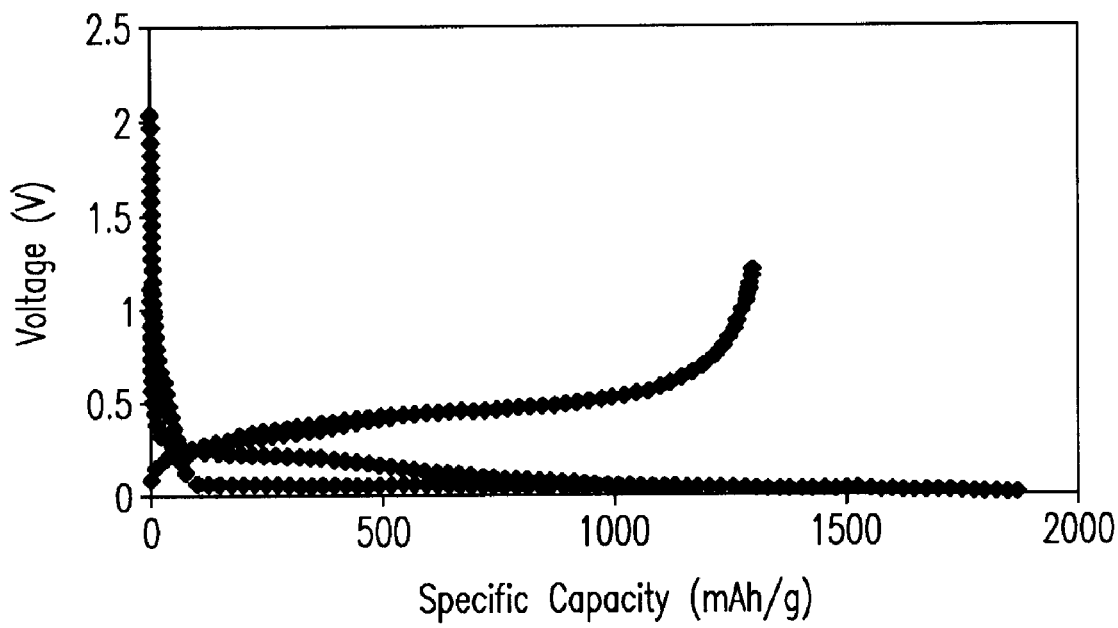
FIG. 4 is a plot showing the charge/discharge profile and specific capacity of Si-based nanowires formed into electrodes for Li-ion batteries according to embodiments of the present invention.

Referring to FIG. 4, a plot shows the charge/discharge profile and specific capacity of $SiO_{1.8}$ nanowires formed into an electrode in a Li-ion battery. The sample tested resulted in an initial charge capacity of 1800 mAh/g and a discharge capacity of 1300 mAh/g. The battery was prepared as follows. The Si-based nanowires (80% weight) were mixed with 10 wt. % of super P carbon and 10 wt. % PVDF binder. N-Methyl-2-pyrrolidone (NMP) was used as the solvent to dissolve NMP. The slurry was then cast on a Cu foil. The thickness of the cathode is ~0.2 mm thick. Electrochemical performance of the Si based anode was tested in a coin cell (type 2325) configuration. Li metal and a porous membrane was used as the counter electrode and separator, respectively. 1M $LiPF_6$ in EC:DEC (1:1) was used as an electrolyte. The coin cell was assembled in an argon filled glove box. Batteries were tested in a Battery Testing System to produce the plot in FIG. 4.

Attempts to synthesize nanowires without introduction of a vapor source were unsuccessful. Quartz furnaces were utilized to avoid residual carbon associated with graphite furnaces. An oxygen trap was used to minimize oxygen contamination. Catalyst precursors were selected to minimize contamination from the ligands. For example, $Ni(N_{O3})_2$ was used as opposed to $Ni(C_{H3}COO)_2$, which tends to leave carbon contamination. Under such conditions, little or no nanowire growth occurred because, as described earlier, the present invention requires the presence of both a vapor source and a solid source.

The prevailing mechanism for nanowire growth according to embodiments of the present invention appears to be the reaction between elements in the vapor source and the semiconductor constituent in the liquid, mixed phase comprising the semiconductor and the catalyst. The consumption of the semiconductor element from the liquid mixed phase establishes a gradient that draws additional semiconductor material from the solid source. Accordingly, the semiconductor powder granules are consumed during nanowire synthesis.

While the examples described herein involve Si as the semiconductor solid source, the present invention is not limited to such. Other suitable materials can include, but are not limited to, Ge and Sn. Using vapor sources that contain oxygen, carbon, or nitrogen, nanowires comprising Ge, $Ge_3N_4$, GeO, $GeO_2$, Sn, SnO, $SnO_2$, etc., can be produced. Suitable catalysts for these growths can include, but are not limited to Ni, Fe, Al, Au, Cu, etc. The temperature for these growths will vary depending on the material system, but should generally occur at, or above, the approximate eutectic or peritectic point.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of fabricating nanowires comprising first and second elements, the method characterized by:
    coating solid powder granules comprising the first element with a catalyst, wherein the catalyst and the first element form a liquid, mixed phase having a eutectic or pertectic point when heated;
    heating the granules coated with the catalyst to a temperature greater than, or equal to, the eutectic or peritectic point; and
    introducing during said heating a vapor source comprising the second element, wherein the vapor source chemically interacts with the liquid, mixed phase to consume the first element and to induce condensation of a product comprising the first and second elements that forms the nanowires.

2. The method of claim 1, wherein the product has a higher melting point than the first element.

3. The method of claim 1, wherein the first element comprises Si.

4. The method of claim 3, further comprising forming the nanowires into an electrode in an energy storage device having a discharge capacity greater than or equal to 400 mAh/g.

5. The method of claim 4, wherein the energy storage device is a Li-ion battery.

6. The method of claim 3, wherein the second element comprises Si.

7. The method of claim 6, wherein the vapor source comprises $SiCl_4$.

8. The method of claim 3, wherein the catalyst comprises Ni and the temperature is between 900° C. and 1050° C.

9. The method of claim 1, wherein the first element comprises Ge or Sn.

10. The method of claim 1, wherein the second element comprises oxygen, nitrogen, carbon, or combinations thereof.

11. The method of claim 1, wherein the catalyst comprises Ni, Fe, Al, Au, Cu, or combinations thereof.

* * * * *